(12) United States Patent
Jovanovic et al.

(10) Patent No.: US 9,157,369 B2
(45) Date of Patent: Oct. 13, 2015

(54) WASTE HEAT UTILIZATION FOR ENERGY EFFICIENT CARBON CAPTURE

(71) Applicants: Stevan Jovanovic, North Plainfield, NJ (US); Ramachandran Krishnamurthy, Chestnut Ridge, NY (US)

(72) Inventors: Stevan Jovanovic, North Plainfield, NJ (US); Ramachandran Krishnamurthy, Chestnut Ridge, NY (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 13/778,583

(22) Filed: Feb. 27, 2013

(65) Prior Publication Data
US 2013/0229012 A1 Sep. 5, 2013

Related U.S. Application Data

(60) Provisional application No. 61/605,393, filed on Mar. 1, 2012.

(51) Int. Cl.
| | |
|---|---|
| F01K 13/02 | (2006.01) |
| F01K 7/34 | (2006.01) |
| F02C 7/10 | (2006.01) |
| F01K 11/02 | (2006.01) |
| H02K 7/18 | (2006.01) |
| F22B 1/18 | (2006.01) |

(52) U.S. Cl.
CPC . F02C 7/10 (2013.01); F01K 11/02 (2013.01); F22B 1/18 (2013.01); H02K 7/1823 (2013.01)

(58) Field of Classification Search
CPC ......... F02C 7/10; H02K 7/1823; F01K 11/02; F22B 1/18
USPC ..................................................... 60/645–681
See application file for complete search history.

(56) References Cited

U.S. PATENT DOCUMENTS

| | | | | |
|---|---|---|---|---|
| 4,081,253 | A | * | 3/1978 | Marion .......................... 518/703 |
| 4,899,544 | A | * | 2/1990 | Boyd ............................... 60/618 |
| 4,977,745 | A | * | 12/1990 | Heichberger .................... 62/619 |

* cited by examiner

Primary Examiner — Hoang Nguyen
(74) Attorney, Agent, or Firm — Philip H. Von Neida

(57) ABSTRACT

A method and system for integrating a power plant and a post combustion carbon capture plant such as a solvent based absorption-regeneration process plant. Electricity is produced by a boiler feeding steam to one or more turbines. The flue gas from the boiler is fed to a waste heat recovery unit which captures heat and provides it to the post combustion capture plant where it can be used in a stripper interstage heater as a supplemental heat for solvent regeneration. Additionally recovered heat can be also integrated with the power generation plant by transferring it to the boiler feed water heating system. Part of the electricity that is generated is also fed to the post combustion capture plant where it will be used to power unit operations therein.

20 Claims, 1 Drawing Sheet

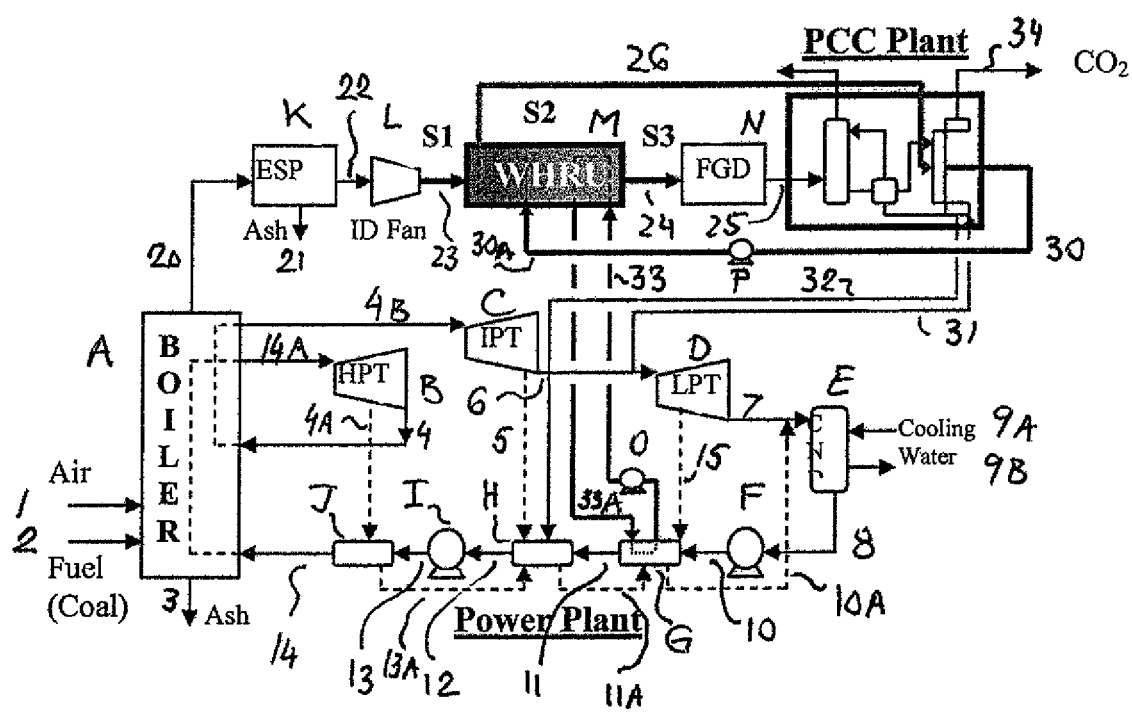

WASTE HEAT UTILIZATION FOR ENERGY EFFICIENT CARBON CAPTURE

CROSS REFERENCE TO RELATED APPLICATIONS

The present application claims priority from U.S. provisional application Ser. No. 61/605,393 filed Mar. 1, 2012.

BACKGROUND OF THE INVENTION

The invention relates to carbon dioxide recovery from fossil fuel based power generation plants using aqueous solutions of amine-based solvents such as mono-ethanol amine (MEA), methyldiethanolamine (MDEA), OASE®-blue from BASF and KS-1 solvents from MHI.

To recover carbon dioxide, it is first absorbed from a gas mixture by contacting the gas with a water solution of amine-based solvent inside an absorber, followed by desorbing the carbon dioxide in a regenerator or stripper and recirculating the regenerated solvent back to the absorber. It is known that the absorption process is enhanced by increased pressure and reduced temperature while the regeneration process is favored by reduced pressure and increased solvent temperature. Increased temperature required for the regeneration within the stripper requires significant amount of thermal energy which is typically proved by a condensation of low pressure saturated steam to heat up a reboiler used for boiling a mixture of carbon dioxide and solvent at the bottom of the stripper.

Significant efforts have been made in discovering new solvents which would require less energy for carbon dioxide absorption and would exhibit higher resistance to oxidative and thermal degradation while allowing for more favorable operating conditions resulting in more energy efficient carbon dioxide recovery processes. In order to enhance carbon dioxide absorption, process improvements such as using an absorber intercooler to control the temperature rise of the solvent due to the exothermicity of the carbon dioxide absorption process have been proposed and implemented in commercial plants.

Additionally, few recent post combustion capture process configurations such as positioning a flue gas blower downstream from the absorber are aimed to reduce post combustion capture parasitic load and to consequently increase net power generation efficiency.

SUMMARY OF THE INVENTION

The invention addresses the industrial challenge of reducing energy requirements for carbon dioxide capture when an absorption system is utilized for carbon dioxide recovery and its further utilization or storage.

In one embodiment of the invention there is disclosed a method for recovering carbon dioxide from a solvent regeneration process comprising the steps:
a) Feeding a flue gas from a boiler of a power plant to a waste heat recovery unit;
b) Capturing heat in the waste heat recovery unit from the flue gas; and
c) Transferring recovered heat to the solvent regeneration process.

In another embodiment of the invention there is disclosed a method for providing heat to a carbon dioxide post combustion capture process comprising the steps:
a) Generating electricity from a boiler by feeding steam from the boiler to one or more turbines;
b) Feeding flue gas from the boiler to a waste heat recovery unit;
c) Capturing heat in the waste heat recovery unit; and
d) Transferring recovered heat to the post combustion capture process.

In a further embodiment of the invention, there is disclosed a method for integrating a power plant and a post combustion capture plant for capture carbon dioxide comprising the steps:
a) Producing electricity by feeding steam from a boiler to one or more turbines;
b) Feeding flue gas from the boiler to a waste heat recovery unit and capturing heat from the flue gas;
c) Feeding electricity generated in step a) to the post combustion capture plant; and
d) Transferring recovered heat captured in step b) to the post combustion capture plant.

The post combustion capture plant is typically a solvent regeneration process which will recover carbon dioxide as a byproduct.

The boiler which is typically heated by combusting a hydrocarbon or fossil fuel which is preferably coal will heat water to produce steam. This steam is fed to the one or more turbines present in the system which will generate electricity as well as produce a condensate. A part of the electricity that is produced can be fed to the post combustion capture plant to provide power to the unit operations present therein. Similarly, a part of the generated low pressure steam, typically withdrawn between intermediate and low pressure turbines, is fed to the reboiler of the stripper to in order to regenerate solvent used for the capture of carbon dioxide in the post combustion capture plant.

The flue gas that results from the burning of the hydrocarbon or fossil fuel can be treated for impurities by an electrostatic precipitator before it is fed to the waste heat recovery unit. The flue gas leaving the boiler is hot compared to the atmosphere around it and this heat can be recovered in the waste heat recovery unit. Warm water, obtained by the condensation of a low pressure stream used as a supplemental heat source for solvent regeneration within the stripper is fed to the Waste Heat Recovery Unit (WHRU) to generate said low pressure steam for the stripper. In addition, the remaining available heat from the flue gas inside the WHRU can be used to provide a supplemental heating duty to a boiler feed water system which can be accomplished either by directly transferring heat from the WHRU to a slip stream of the boiler feed water stream, or by an indirect cooling-heating circulation system by utilizing corresponding heat exchangers, in order to increase electrical power generation efficiency.

Alternatively, the above described two heating circuits can be combined into a single waste heat recovery system circuit where an access enthalpy of warm water, obtained by condensation of said low pressure steam supplied to the stripper, is used to heat up a boiler feed water stream before being returned to a WHRU for said low pressure steam generation. The heat in the form of low pressure steam is fed from the waste heat recovery unit to a stripper interstage heater in the post combustion capture plant and can provide additional heat to boiler feed water heaters that are typically present in all steam based power generation plants.

The invention provides for innovative, energy efficient process integration options to extract a significant part of the waste heat, such as a low grade sensible heat carried out with the gaseous effluents from the boiler of a power plant, and to transfer it to a solvent regeneration column of the post combustion capture plant, in order to reduce significant steam requirement for the reboiler duty, otherwise produced by burning dedicated fuel to produce steam or by extracting steam from existing steam turbines. In case of power plant with post combustion carbon dioxide capture this approach ultimately increases the net efficiency of power production with post combustion carbon dioxide capture processes.

While the invention provides an example of power generation with post combustion carbon dioxide capture (PCC), it can be equally successfully utilized in other industrial applications.

In most of the current designs of Post Combustion Capture plants, a significant amount of low pressure steam, extracted from the intermediate to low pressure steam crossover of the steam-water cycle of the power plant, is used for the reboiler duty requirements for solvent regeneration. Energy requirements for solvent regeneration (typically from 3.0 to 4.0 $GJ/Te\_CO_2$) significantly contribute to the overall reduction of net power production when the PCC plant is used for carbon dioxide recovery and capture.

It is proposed to recover a significant part of Waste Heat (enthalpy difference between the flue gas stream entering the waste heat recovery unit (typically at temperature of 150° to 200° C.) and the flue gas stream that leaves the waste heat recovery unit (in the range from 110° to 150° C.) to generate an additional amount of low pressure steam (below 5 bara) for enhanced solvent regeneration by utilizing a Stripper Interstage Heater which requires steam at lower pressure and temperature than common reboilers. In such a way, the overall parasitic heat load related to solvent regeneration can be reduced by up to 10%. In addition, secondary waste heat recovery step obtained by reducing the flue gas stream temperature from 110° to 150° C. to below 100° C. (S3 stream), could be used to heat up water circulating between waste heat recovery unit (WHRU) and Boiler Feed Water Heaters (BFWH), which consequently further increases gross power production, i.e. net power generation efficiency.

BRIEF DESCRIPTION OF THE DRAWINGS

The FIGURE is a schematic of a power plant containing a post combustion carbon dioxide capture scheme per the invention.

DETAILED DESCRIPTION OF THE INVENTION

Turning to the FIGURE, air and fuel are fed into an industrial boiler A through lines 1 and 2 respectively. The fuel can be any typical hydrocarbon-based or fossil fuels that can combust in the presence of oxygen. Typically the fuel is coal which when burned will also create an ash which can be removed from the boiler A through line 3. The boiler A will boil high pressure water fed through line 14 to produce high pressure steam. This steam is fed through line 14A to high pressure turbine B. A discharge steam from High Pressure Turbine B is typically fed back to the boiler A via line 4. Reheated intermediate pressure steam is the fed to the intermediate pressure steam turbine C via line 4b. Discharge steam from intermediate pressure turbine C, now at a low pressure is fed through line 6 to a low pressure turbine D. Finally, a discharge steam from low pressure turbine D, typically at subatmospheric pressure, is fed to a condenser E via line 7. Cooling water is fed to the condenser via line 9A, and then, typically returned via line 9B to a cooling water tower, Condensed subatmospheric pressure steam is withdrawn from the condenser as cold water via line 8 and then fed to a water pump F. Pressurized cold water is then fed to a series of boiler feed water heaters (G, H and J) via corresponding to lines (10, 11 and 13), respectively. Water pump I increases the pressure of water fed with line 12 to a pressure inside the line 13, sufficiently high to produce the required high pressure steam fed through line 14A to the high pressure turbine.

Multiple steam extraction points existing at high pressure turbine, intermediate pressure turbine and low pressure turbine are used to assist heating of boiler feed water via lines 4A, 5 and 15 and related boiler feed water heaters J, H and G, respectively. In addition, supplemental heat generated from the waste heat recovery unit by heating circulating water from boiler feed water heater G fed by line 33 with assistance of water pump O is transferred to the boiler feed water stream via transfer line 33A and boiler feed water heater G.

A significant fraction of low pressure steam drawn from intermediate pressure turbine C via line 6 is redirected to the reboiler of the stripper in the post combustion capture plant via line 31. This low pressure steam, typically between 5 and 12 Bara is used to provide the necessary heat to the reboiler of the stripper for the regeneration of solvent used for post combustion carbon dioxide capture. After transferring heat inside the reboiler to the solvent, said low pressure steam becomes warm water which is then fed to the boiler feed water heater H via line 32.

The hydrocarbon or fossil fuel that is burned to heat the boiler will produce a flue gas which must be treated in the process. This flue gas will contain particulates and ash as well as sulfur, heavy metal compounds and other contaminants. Particularly where certain types of coal are burned, the amount of sulfur must be reduced prior to the flue gas being used. The flue gas will leave boiler A through line 20 and be directed to an electrostatic precipitator K where fly ash will be removed through line 21. This flue gas which is lower in particulate matter is fed through line 22 to an Indused Draft (ID) fan L The flue gas is fed from the ID fan L through line 23 to the waste heat recovery unit M. The waste heat recovery unit is designed to recover heat from hot flue gas stream that passes through its heat exchanger mechanism and to transfer recovered heat to water streams 30A and 33, which generates low pressure steam (line 26) and warm water (line 33A) as supplemental heating sources for the stripper of the PCC plant and for the boiler feed water heaters, respectively. A flue gas stream with significantly reduced temperature at the outlet of the WHRU M is further fed to the Flue Gas Desulphurization unit N via line 24. Desulphurized, cooled flue gas is then fed to the absorber of the PCC plant for $CO_2$ removal via line 25. Generated low pressure steam from the WHRU is fed to an interstage heater of the solvent stripper inside the PCC plant via line 26. Condensed low pressure steam leaves the stripper's interstage heater as warm water via line 30 and is transferred back to the WHRU M by water pump P via line 30A.

A secondary heat recovery circuit is used to transfer residual heat from the flue gas to the boiler feed water heaters by heating up water fed by line 33 and sending such heated water via line 33A to the boiler feed water heater G. Water pump O facilitates recirculation of the water from line 33, through the heat exchanger inside the WHRU to line 33A and then through heater G back to the pump O.

Many alternative arrangements can be envisioned in order to optimize the Waste Heat Recovery Unit operation for specific objectives. One of the alternative options, mentioned above, is to redirect warm condensate from stripper's interstage heater via line 30 first to boiler feed water heater G (instead of utilizing line 33A as a feed to the heater G). Outlet water stream from heater G can then be transferred with pump O and via line 33 to the WHRU M. In this configuration, after water introduced by line 33 passes through multiple heat exchangers inside the WHRU M, a low pressure steam can be generated and transferred to the stripper interstage heater of the PCC plant via line 26.

Recovered carbon dioxide is discharged from the PCC plant via line 34 and then further processed to satisfy the intended final application, including, for example Enhanced Oil Recovery (EOR) or underground sequestration.

The invention provides for waste heat recovery and its innovative integration with solvent regeneration heat requirements and with boiler feed water heating systems, utilized by interstage heaters operating at lower temperature than reboiler, leads to the following improvements:

The utilization of the invention will result in a significantly reduced amount of steam consumption for reboiler duty requirements. When the invention is applied to power production, it facilitates reduced steam extraction for the Boiler Feed Water Heater requirements; increased net power production efficiency, and reduced cost of electricity for power plants with carbon dioxide capture.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for recovering carbon dioxide from a solvent regeneration process comprising the steps: a) Feeding a flue gas from a boiler of a power plant to a waste heat recovery unit, wherein the flue gas is treated for impurities prior to it being fed to the waste heat recovery unit; b) Capturing heat in the waste heat recovery unit from the flue gas; and c) Feeding the heat to the solvent regeneration process, and further feeding heat from the glue gas to water form a boiler feed water heater present in the waste heat recovery unit thereby recirculating water through the heat exchanger in the waste heat recovery unit to the boiler feed water heater.

2. The method as claimed in claim 1 wherein said solvent regeneration process produces carbon dioxide.

3. The method as claimed in claim 1 wherein the boiler produces steam which is fed to one or more turbines.

4. The method as claimed in claim 1 wherein the one or more turbines produces electrical power for the solvent regeneration process.

5. The method as claimed in claim 1 wherein the boiler is heated by combusting a hydrocarbon or fossil fuel.

6. The method as claimed in claim 1 wherein steam from the waste heat recovery unit is fed to a stripper interstage heater in the solvent regeneration process.

7. The method as claimed in claim 1 wherein the waste heat recovery unit provides heat to boiler feed water heaters in the power plant.

8. A method for providing heat to a carbon dioxide post combustion capture process comprising the steps: a) Generating electricity from a boiler by feeding steam from the boiler to one or more turbines; b) Feeding flue gas from the boiler to a waste heat recovery unit, wherein the flue gas is treated for impurities prior to it being fed to the waste heat recovery unit; c) Capturing heat in the waste heat recovery unit; and d) Feeding heat to the post combustion capture process, and further feeding heat from the flue gas to water from a boiler feed water heater present in the waste heat recovery unit thereby recirculating water through the heat exchanger in the waste heat recovery unit to the boiler feed water heater.

9. The method as claimed in claim 8 wherein the carbon dioxide post combustion capture process utilizes solvent regeneration.

10. The method as claimed in claim 8 wherein said heat is in the form of steam.

11. The method as claimed in claim 8 wherein the one or more turbines produces electrical power for the solvent regeneration process.

12. The method as claimed in claim 8 wherein the boiler is heated by combusting a hydrocarbon or fossil fuel.

13. The method as claimed in claim 8 wherein steam from the waste heat recovery unit is fed to a stripper interstage heater in the solvent regeneration process.

14. The method as claimed in claim 8 wherein the waste heat recovery unit provides heat to boiler feed water heaters in the power plant.

15. A method for integrating a power plant and a post combustion capture plant for capturing carbon dioxide comprising the steps: a) Producing electricity by feeding steam from a boiler to one or more turbines; b) Feeding flue gas from the boiler to a waste heat recovery unit, wherein the flue gas is treated for impurities prior to it being fed to the waste heat recovery unit and capturing heat from the flue gas; c) Feeding electricity generated in step a) to the post combustion capture plant; and d) Feeding heat captured in step b) to the post combustion capture plant, and further feeding heat from the flue gas to water from a boiler feed water heater present in the waste heat recovery unit thereby recirculating water through the heat exchanger in the waste heat recovery unit to the boiler feed water heater.

16. The method as claimed in claim 15 wherein the post combustion capture plant is a solvent regeneration process.

17. The method as claimed in claim 15 wherein the boiler is heated by combusting a hydrocarbon or fossil fuel.

18. The method as claimed in claim 15 wherein condensate from the one or more turbines is fed to the waste heat recovery unit.

19. The method as claimed in claim 15 wherein steam from the waste heat recovery unit is fed to a stripper interstage heater in the solvent regeneration process.

20. The method as claimed in claim 15 wherein the waste heat recovery unit provides heat to boiler feed water heaters in power plant.

* * * * *